(12) United States Patent
Hjorth et al.

(10) Patent No.: US 10,670,055 B2
(45) Date of Patent: *Jun. 2, 2020

(54) HYDRAULIC SYSTEM AND A METHOD FOR OPERATING A HYDRAULIC SYSTEM

(71) Applicant: Danfoss Power Solutions ApS, Nordborg (DK)

(72) Inventors: Henrik Hjorth, Graasten (DK); Erik Christensen, Aabenraa (DK)

(73) Assignee: Danfoss Power Solutions ApS, Nordborg (DK)

( * ) Notice: Subject to any disclaimer, the term of this patent is extended or adjusted under 35 U.S.C. 154(b) by 29 days.

This patent is subject to a terminal disclaimer.

(21) Appl. No.: 15/918,419

(22) Filed: Mar. 12, 2018

(65) Prior Publication Data

US 2018/0223883 A1 Aug. 9, 2018

Related U.S. Application Data

(63) Continuation of application No. 14/785,661, filed as application No. PCT/EP2014/056444 on Mar. 31, 2014, now Pat. No. 10,036,409.

(30) Foreign Application Priority Data

Jun. 4, 2013 (EP) ..................................... 13170449

(51) Int. Cl.
*F15B 21/08* (2006.01)
*F16K 37/00* (2006.01)
(Continued)

(52) U.S. Cl.
CPC ........ *F15B 21/085* (2013.01); *F15B 13/0867* (2013.01); *F15B 19/005* (2013.01);
(Continued)

(58) Field of Classification Search
CPC .. F15B 21/085; F15B 13/0867; F15B 19/005; G05D 7/0652; G05B 19/042;
(Continued)

(56) References Cited

U.S. PATENT DOCUMENTS 6,000,825 A * 12/1999 Fredriksson ............ B66C 15/00
700/11
6,687,698 B1 * 2/2004 Nixon ................. G05B 19/4145
(Continued)

FOREIGN PATENT DOCUMENTS

CN 1386152 A 12/2002
CN 1715685 A 1/2006
(Continued)

*Primary Examiner* — Christopher E. Everett
(74) *Attorney, Agent, or Firm* — McCormick, Paulding & Huber PLLC

(57) ABSTRACT

A hydraulic system (1) is provided comprising a group of at least two valves (2a, 2b, 2c) connected to a bus (8), each of said valves (2a, 2b, 2c) comprising a primary memory (9a, 9b, 9c) for storing a set of parameters of the valve (2a, 2b, 2c). The service work of such a hydraulic system should be facilitated. To this end each valve (2a, 2b, 2c) comprises a secondary memory (10a, 10b, 10c) storing said set of parameters of a different valve (2b, 2c, 2a) of said group.

21 Claims, 1 Drawing Sheet

(51) Int. Cl.
  *F15B 13/08* (2006.01)
  *F15B 19/00* (2006.01)
  *G05B 19/042* (2006.01)
  *G05D 7/06* (2006.01)
(52) U.S. Cl.
  CPC ........ *F16K 37/0025* (2013.01); *G05B 19/042* (2013.01); *G05D 7/0652* (2013.01); *G05B 2219/23348* (2013.01); *G05B 2219/23371* (2013.01); *G05B 2219/23391* (2013.01)
(58) Field of Classification Search
  CPC ........... G05B 2219/23348; G05B 2219/23371; G05B 2219/23391
  See application file for complete search history.

(56) References Cited

U.S. PATENT DOCUMENTS

| | | | |
|---|---|---|---|
| 6,718,245 B2 | 4/2004 | Watanabe et al. | |
| 6,978,294 B1* | 12/2005 | Adams | H04L 67/34 709/217 |
| 7,023,795 B1* | 4/2006 | Hwu | H04L 43/0811 370/219 |
| 7,398,796 B2 | 7/2008 | Hjorth et al. | |
| 7,577,482 B1* | 8/2009 | Steele | G05B 19/042 700/19 |
| 2002/0013642 A1* | 1/2002 | Choi | B23K 3/0623 700/275 |
| 2004/0083278 A1* | 4/2004 | Becherer | G05B 19/4185 709/221 |
| 2004/0128034 A1* | 7/2004 | Lenker | G05D 7/0635 700/282 |
| 2005/0026486 A1* | 2/2005 | Thomas | G06F 9/4413 439/188 |
| 2006/0141931 A1* | 6/2006 | Da Silva Neto | G05B 19/4185 455/41.1 |
| 2007/0019745 A1* | 1/2007 | Donadio | H04L 41/0663 375/259 |
| 2008/0208923 A1* | 8/2008 | Watanabe | G06F 11/1004 |

FOREIGN PATENT DOCUMENTS

| | | |
|---|---|---|
| CN | 101276208 A | 10/2008 |
| EP | 2570744 A1 | 3/2013 |
| GB | 2271491 B | 4/1994 |

* cited by examiner

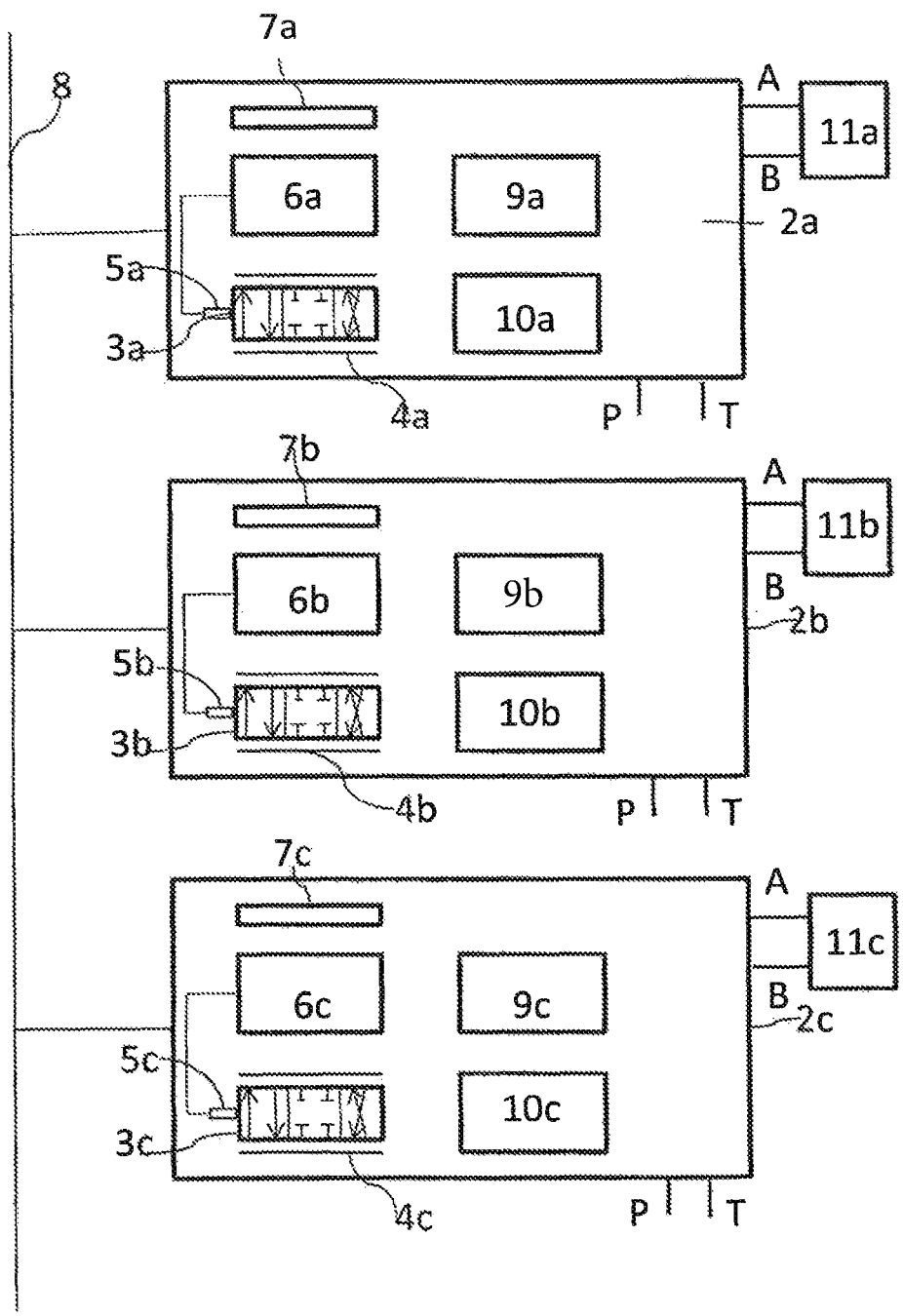

HYDRAULIC SYSTEM AND A METHOD FOR OPERATING A HYDRAULIC SYSTEM

CROSS-REFERENCE TO RELATED APPLICATIONS

This application is a continuation of U.S. patent application Ser. No. 14/785,661, filed Oct. 20, 2015, which is the National Stage filing of International Patent Application No. PCT/EP2014/056444, filed Mar. 31, 2014, which claims priority to European Patent Application Serial No. 13170449.6, filed Jun. 4, 2013, all of which are incorporated herein by reference in their entireties.

TECHNICAL FIELD

The present invention relates to a hydraulic system comprising a group of at least two valves connected to a bus, each of said valves comprising a primary memory for storing a set of parameters of the valve.

BACKGROUND

Furthermore, the invention relates to a method for operating a hydraulic system comprising a group of at least two valves connected to a bus, wherein each valve comprises a primary memory for storing a set of parameters for the valve.

The set of parameters comprises at least one parameter, for example, a maximum flow at the output of the valve, a maximum allowable pressure, a maximum allowable operating speed and so on. In many cases the set of parameters is determined by the consumer connected to the hydraulic valve. The set of parameters may be loaded into the primary memory via the bus. However, such a procedure is time-consuming and requires special equipment.

SUMMARY

The object underlying the invention is to facilitate service work.

This object is solved in a hydraulic system of a kind mentioned above in that each valve comprises a secondary memory storing said set of parameters of a different valve of said group.

In this way the group of valves forms a backup system for the parameters for the valves. The set of parameters of each valve is stored in the primary memory of this particular valve. However, when the memory is damaged or the valve has to be replaced, the set of parameter is not lost, but stored in the secondary memory of another valve. Since the other valve is contained in the same group of valves, it is relative simple to download the set of parameters from the secondary memory of the other valve to the primary memory of the specific valve.

Preferably the valves are electro-hydraulic valves. An electro-hydraulic valve can be controlled by means of electric energy, in other words by means of electrical signals. The set of parameters can easily be transformed into electrical signals thereby performing an operation of the valve which makes it sure that the parameters are taken into account.

Preferably each valve comprises a microcontroller. The microcontroller uses the set of parameters stored in the primary memory during operation of the valve. The microcontroller can get operating demands via the bus. The bus can be a field bus, e.g. a CAN-bus.

Preferably each valve comprises an address unique in said group of valves. This address can be used to identify the valve and consequently to identify the primary memory.

Preferably at least a spare part valve is provided having an address different from all addresses in said group. The spare part valve can therefore be used to replace any similar valve in said group without being fixed to a specific position.

The object is solved in a method as mentioned above in that said set of parameters is stored in a secondary memory of another valve of said group.

In this way a set of parameters is stored at least in two different places in the group of valves. Therefore, even if the set of parameters is lost in one location, it can easily be backed up from the other location.

Preferably during a check-phase the primary memory and the secondary memory of each valve are compared with each other. In this way it is possible to check whether the contents of the primary memory of a specific valve still coincides with the contents of the secondary memory which is physically away from the primary memory since it is positioned in another valve of the group. When there are differences between the primary memory and the secondary memory, appropriate corrections can be made.

In this case it is preferred that a check sum value of a memory area of said primary memory and a check sum value of a memory area of said secondary memory are calculated and compared with each other. The use of a check sum value is a simple means for comparing the primary memory and the secondary memory. Only one value per memory has to be calculated so that the examination can be done without heavy work load.

In a preferred embodiment in case of a defect valve or a replacement of a valve by a spare part valve, said set of parameters is downloaded from said secondary memory of said other valve into the primary memory of said defect valve or of said spare part valve. The term "defect valve" means that the primary memory and the secondary memory have differences. It does not necessarily mean that the valve is defect in a mechanical sense. However, it means that it cannot be guaranteed that the operational behavior is as it should be. In such a case or in a case of a replacement the secondary memory of a valve apart from the defect or of the spare part valve can be used to download the set of parameters so that after the download the specific valve can be used without further service work.

In a preferred embodiment a first valve comprising a secondary memory of another valve examines if the other valve is available on the bus and, if it is not available, however a spare part is available, the primary memory of said spare part valve is updated by the secondary memory of said first valve. The examination can be performed by use of the microcontroller which basically has to use only the address of the valve the set of parameters of which is stored in the secondary memory. If this address is available in the group of valves, for example, via the bus, it can be checked whether the two memories have the same content. If this address is not available, however, a valve with a spare part address is available, the valve group will determine, if one or more valve(s) is/are missing. The missing valve, for example with the lowest address, will be recreated by updating its back-up into the spare part. After updating, the check sum is calculated and controlled by the back-up valve.

Preferably, said check-phase is a start phase. In other words, the check is made during each start of the hydraulic system.

BRIEF DESCRIPTION OF THE DRAWING

An embodiment of the invention will now be described in more detail with reference to the drawing, wherein:

The only FIGURE is a schematic illustration of a hydraulic system.

A hydraulic system 1 comprises a group of at least two valves, in the present embodiment three valves 2a, 2b, 2c. The valves 2a, 2b, 2c can be connected mechanically, i.e. they can form a valve bloc, however, this is not necessary. They can be of different mechanical construction or they can be of the same mechanical construction. Each valve 2a, 2b, 2c comprises at least a pressure supply port P, a tank port T and one or more working ports A, B.

Each valve 2a, 2b, 2c comprises a valve element 3a, 3b, 3c in a valve housing 4a, 4b, 4c. The valve element 3a, 3b, 3c can be, for example, a spool or a slide. Each valve element 3a, 3b, 3c can be moved or operated by means of a drive 5a, 5b, 5c. The drive 5a, 5b, 5c is preferably an electro-hydraulic drive, i.e. the energy for moving the valve element 3a, 3b, 3c is provided by a hydraulic fluid under pressure and this pressure is controlled electrically, for example by means of a solenoid. The position of the valve element 3a, 3b, 3c in its valve housing 4a, 4b, 4c determines a flow of hydraulic fluid from the pressure supply port P to one of the working ports A, B and from the other working port B, A to the tank port T. The valves 2a, 2b, 2c may have further ports which are not shown.

Each valve 2a, 2b, 2c comprises a microcontroller 6a, 6b, 6c which is shown to be connected with the drive 5a, 5b, 5c. Furthermore, each valve 2a, 2b, 2c is provided with an address 7a, 7b, 7c. The address 7a, 7b, 7c is shown to be a separate "part". However, it can be part of or stored in a memory of the microcontroller 6a, 6b, 6c.

All valves 2a, 2b, 2c are connected to a bus 8, for example a field bus, such as a CAN bus. Operating commands for actuating the valve 2a, 2b, 2c can be transmitted via the bus 8.

Each valve 2a, 2b, 2c comprises a primary memory 9a, 9b, 9c and a secondary memory 10a, 10b, 10c. The primary memory 9a and the secondary memory 10a of the valve 2a are shown to be physically separated from each other. However, they can be physically combined in a common memory element. The same is true for the primary memories 9b, 9c and the secondary memories 10b, 10c of the other valves 2b, 2c.

The primary memory 9a, 9b, 9c of each valve 2a, 2b, 2c stores a set of parameters for this valve. The set of parameters comprises at least a parameter, however, in most cases the set of parameters comprises more than one parameter. Such a parameter can be the allowable maximum flow, the allowable maximum pressure, the allowable maximum speed of movement of the valve element 3a, 3b, 3c, and so on. The memories 9a, 9b, 9c; 10a, 10b, 10c are non-volatile memories (EEPROM). The set of parameters can be used for control and set-up of each specific valve.

The set of parameters for the valve 2a is not only available in the primary memory 9a in this valve 2a. However, it is available as well in a secondary memory 10b of another valve 2b. In the same way, the set of parameters of the valve 2b is not only available in the primary memory 9b of this valve, but also in the secondary memory 10c of another valve 2c. The set-up parameter of the valve 2c is available in the primary memory 9c of this valve 2c and additionally in the secondary memory 10a of the valve 2a.

Consequently, when new parameters are downloaded to a valve, the parameters must be stored in both the memory of the valve and in the memory of a different valve. When parameters are downloaded for the valve 2a, they are stored in the primary memory 9a of this valve 2a and in the secondary memory 10b of the other valve 2b.

During each start of the hydraulic system or of the groups of valves 2a, 2b, 2c, the so called "back-up valve" will examine, if the valve, for which it comprises a secondary memory, is available on the field bus 8. In other words, the back-up valve is the valve comprising the secondary memory 10b, 10c, 10a for another valve 2a, 2b, 2c. If this other valve 2a, 2b, 2c is available on the bus 8, both the valves 2a, 2b, 2c and the back-up valves 2b, 2c, 2a calculate a check sum value of the memory area of the primary memory 9a, 9b, 9c and of the secondary memory 10b, 10c, 10a. The back-up valve 2b, 2c, 2a send the check sum of the secondary memory 10b, 10c, 10a to the primary valve 2a, 2b, 2c. If the check sum values of equal, the valves 2a, 2b, 2c will continue the starting procedure. If the check sum values are not equal, the primary valves 2a, 2b, 2c must updated its parameters into the back-up valves 2b, 2c, 2a, so that all values are equal. Another possibility would be that the primary memory 9a, 9b, 9c is updated by the contents of the secondary memory 10b, 10c, 10a.

If the check sum values of the primary memory and the secondary memory are different, the valve is deemed to be a "defect valve". However, in many cases, this "defect" can be removed by updating the primary memory 9a, 9b, 9c.

In some cases it is necessary to replace a valve, for example, if the valve shows a mechanical defect.

It is assumed that the valve 2c has been replaced by a spare part valve. Therefore, the address 7c of the valve 2c has changed.

During each start of the valve group of the valves 2a, 2b and the replaced valve 2c, the back-up valve (in this case valve 2a) will examine if the valve 2c, for which it comprises a secondary memory 10a is available on the bus 8. If it is not available, however, a valve with a spare part address is available, the valve group will determine, if one or more valve(s) is/are missing. The missing valve 2c with the lowest address will be recreated by updating its back-up into the spare part 2c. After updating, the check sum is calculated and controlled by the back-up valve 2a.

By adding a new spare part valve and make a new start, this procedure can be repeated.

When all required valves have been updated, the valve group will function correctly after the next start.

A hydraulic consumer 11a, 11b, 11c is connected to each of the valves 2a, 2b, 2c shown. The consumer 11a, 11b, 11c could be a hydraulic cylinder, for example for controlling the scoop of a backhoe.

The valves 2a, 2b, 2c shown are usually joined in groups, which are connected to a supply, for example from a pump, and to a tank. The input for the valve group often consists of a so called end module, to which also the supply is connected. The end module can also have a built-in microcontroller with memory etc. In this end module it could be imagined to store all parameters for the whole group, so that they were all gathered in one place. In this situation it could be imagined that the module coming right after the end module could contain a backup of the parameters for all valves in the group and that this backup could be used, if, for some reason the end module had to be replaced.

Usually, the CAN bus will have a connection to a central controller, and it can thus be imagined that, if the vehicle has several valve groups, the central controller can collect all parameters for all groups, so that whole groups can be replaced without problems.

Usually, the valves 2a, 2b, 2c shown will also have some sort of built-in transducer that measures the deflection of the valve slide (for example an LVDT transducer), and this/these parameter(s) can also be stored in the memory.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic system comprising:
two or more groups of valves, each group of valves comprising at least two valves connected to a bus for communicating therebetween, each of said at least two valves in each group comprising a primary memory for storing a set of parameters of the valve and a secondary memory storing a set of parameters of a different valve of the same group, and
wherein a back-up valve of said at least two valves is configured to send a check sum value of the secondary memory of said back-up valve to a primary valve of said at least two valves during a start phase of the hydraulic system or during a start phase of said at least two valves, and
wherein, if the check sum value of the secondary memory of said back-up valve is not equal to a check sum value of the primary memory of said primary valve, said primary valve is configured to update the primary memory of said primary valve with said set of parameters of the secondary memory of said back-up valve or said back-up valve is configured to update the secondary memory of said back-up valve with said set of parameters of said primary memory of said primary valve.

2. The hydraulic system according to claim 1, wherein the valves are electro-hydraulic valves.

3. The hydraulic system according to claim 2, wherein each valve comprises a microcontroller.

4. The hydraulic system according to claim 2, wherein each valve comprises an address unique in said group of valves.

5. The hydraulic system according to claim 1, wherein each valve comprises a microcontroller.

6. The hydraulic system according to claim 5, wherein each valve comprises an address unique in said group of valves.

7. The hydraulic system according to claim 1, wherein each valve comprises an address unique in said group of valves.

8. The hydraulic system according to claim 7, wherein at least a spare part valve is provided having an address different from all addresses in said group.

9. A method for operating a hydraulic system comprising two or more groups of valves, the method comprising the steps of:
providing at least two valves connected to a bus in each group of valves,
wherein each of the at least two valves in each group comprises a primary memory for storing a set of parameters for the valve and a secondary memory for storing a set of parameters of a different valve of the same group,
storing the set of parameters for each valve in the primary memory,
storing the set of parameters of a different valve of the same group in the secondary memory of each valve,
sending, by a back-up valve of said at least two valves, a check sum value of the secondary memory of said back-up valve to a primary valve of said at least two valves during a start phase of the hydraulic system or during a start phase of said at least two valves, and
if the check sum value of said secondary memory of said back-up valve is not equal to a check sum value of the primary memory of said primary valve, updating the primary memory of said primary valve with said set of parameters of said secondary memory of said back-up valve or updating the secondary memory of said back-up valve with said set of parameters of the primary memory of said primary valve.

10. The method according to claim 9, further comprising the step of comparing the primary memory and the secondary memory of each valve with each other during a check-phase.

11. The method according to claim 10, further comprising the step of calculating and comparing a check sum value of a memory area of said primary memory and a check sum value of a memory area of said secondary memory with each other.

12. The method according to claim 11, further comprising the steps of:
examining, by a first one of the valves with a secondary memory storing the set of parameters of a second one of the valves, if the second one of the valves is available on the bus;
if the second one of the valves is not available on the bus, but a spare part valve is available, updating a primary memory of the spare part valve with the set of parameters stored in the secondary memory of the first one of the valves.

13. The method according to claim 12, wherein said check-phase is a start phase.

14. The method according to claim 11, further comprising the steps of:
examining, by a first one of the valves with a secondary memory storing the set of parameters of a second one of the valves, if the second one of the valves is available on the bus;
if the second one of the valves is not available on the bus, but a spare part valve is available, updating a primary memory of the spare part valve with the set of parameters stored in the secondary memory of the first one of the valves.

15. The method according to claim 11, wherein said check-phase is a start phase.

16. The method according to claim 10, wherein said check-phase is a start phase.

17. The method according to claim 10, further comprising the step of downloading said set of parameters from the secondary memory of one of the valves into the primary memory of another one of the valves that is a defect valve or of a spare part valve for replacing a defect valve or a spare part valve.

18. The method according to claim 9, further comprising the step of downloading said set of parameters from the secondary memory of one of the valves into the primary memory of another one of the valves that is a defect valve or of a spare part valve for replacing a defect valve or a spare part valve.

19. The method according to claim 18, further comprising the steps of:
examining, by a first one of the valves with a secondary memory storing the set of parameters of a second one of the valves, if the second one of the valves is available on the bus;
if the second one of the valves is not available on the bus, but a spare part valve is available, updating a primary memory of the spare part valve with the set of parameters stored in the secondary memory of the first one of the valves.

20. The method according to claim 18, further comprising the step of:
calculating and comparing a check sum value of a memory area of said primary memory of the spare part valve and a check sum value of a memory area of said secondary memory with each other after the step of updating the primary memory of the spare part valve.

21. A method for operating a hydraulic system comprising two or more groups of valves, the method comprising the steps of:
providing at least two valves connected to a bus in each group of valves,
wherein each of the at least two valves in each group comprises a primary memory for storing a set of parameters for the valve and a secondary memory for storing a set of parameters of a different valve of the same group,
storing the set of parameters for each valve in the primary memory,
storing the set of parameters of a different valve of the same group in the secondary memory of each valve,
downloading said set of parameters from the secondary memory of one of the valves into the primary memory of another one of the valves that is a defect valve or of a spare part valve for replacing a defect valve or a spare part valve, and
calculating and comparing a check sum value of a memory area of said primary memory of the spare part valve and a check sum value of a memory area of said secondary memory with each other after the step of updating the primary memory of the spare part valve.

* * * * *